(12) United States Patent (10) Patent No.: US 12,521,669 B2
Ough et al. (45) Date of Patent: Jan. 13, 2026

(54) MODULAR GAS PROCESSING SYSTEM

(71) Applicant: VOLTAGRID LLC, Bellaire, TX (US)

(72) Inventors: Nathan Ough, Bellaire, TX (US); Leslie Michael Wise, Houston, TX (US); Tejinder Singh Gill, Calgary (CA)

(73) Assignee: VOLTAGRID LLC, Houston, TX (US)

( * ) Notice: Subject to any disclaimer, the term of this patent is extended or adjusted under 35 U.S.C. 154(b) by 594 days.

(21) Appl. No.: 18/055,503

(22) Filed: Nov. 15, 2022

(65) Prior Publication Data

US 2024/0157282 A1 May 16, 2024

(51) Int. Cl.
| | |
|---|---|
| *B01D 53/02* | (2006.01) |
| *B01D 53/00* | (2006.01) |
| *B01D 53/04* | (2006.01) |
| *B01D 53/14* | (2006.01) |
| *B01D 53/26* | (2006.01) |
| *B01D 53/28* | (2006.01) |
| *F17D 3/14* | (2006.01) |

(52) U.S. Cl.
CPC ....... *B01D 53/0454* (2013.01); *B01D 53/002* (2013.01); *B01D 53/1437* (2013.01); *B01D 53/1493* (2013.01); *B01D 53/263* (2013.01); *B01D 53/266* (2013.01); *B01D 53/28* (2013.01); *F17D 3/145* (2013.01); *B01D 2252/2023* (2013.01); *B01D 2257/304* (2013.01); *B01D 2257/702* (2013.01); *B01D 2257/80* (2013.01)

(58) Field of Classification Search
CPC ...... B01D 2252/2023; B01D 2257/304; B01D 2257/702; B01D 2257/80; B01D 53/002; B01D 53/0454; B01D 53/1437; B01D 53/1493; B01D 53/263; B01D 53/266; B01D 53/28; F17D 3/145
See application file for complete search history.

(56) References Cited

U.S. PATENT DOCUMENTS

| | | | | |
|---|---|---|---|---|
| 2,498,229 | A | * | 2/1950 | Adler ........................ B60P 3/14 |
| | | | | 222/626 |
| 3,727,651 | A | * | 4/1973 | Biever ...................... F17C 9/02 |
| | | | | 141/82 |
| 10,591,184 | B2 | | 3/2020 | La Porte |
| 10,862,307 | B2 | | 12/2020 | Cavness et al. |
| 10,862,309 | B2 | | 12/2020 | Cavness et al. |
| 11,549,351 | B1 | | 1/2023 | Fournier |
| 11,674,484 | B2 | | 6/2023 | Oehring |
| 11,686,188 | B1 | | 6/2023 | Fournier |

(Continued)

FOREIGN PATENT DOCUMENTS

| | | |
|---|---|---|
| CA | 2851304 | 1/2016 |
| CA | 2911852 | 9/2021 |

(Continued)

*Primary Examiner* — Christopher P Jones
(74) *Attorney, Agent, or Firm* — Morgan, Lewis & Bockius LLP

(57) ABSTRACT

A modular gas processing system built with various gas processing modules and cubes improve transportability and customization. Individual gas processing modules and cubes can be included or removed in multiple combinations for customization because each module has a common interconnection point for connecting to any other gas processing module and cube.

7 Claims, 8 Drawing Sheets

(56) References Cited

U.S. PATENT DOCUMENTS

| | | |
|---|---|---|
| 12,078,110 B2 | 9/2024 | Oehring et al. |
| 2019/0118198 A1* | 4/2019 | Matlack .................. B05B 14/30 |
| 2020/0048971 A1* | 2/2020 | Keast ...................... E21B 3/022 |
| 2020/0232675 A1 | 7/2020 | La Porte |
| 2023/0018992 A1 | 1/2023 | Hinderliter et al. |

FOREIGN PATENT DOCUMENTS

| | | |
|---|---|---|
| WO | 2014197969 | 12/2014 |
| WO | 2023141085 | 7/2023 |

* cited by examiner

MODULAR GAS PROCESSING SYSTEM

TECHNICAL FIELD

The present disclosure relates generally to natural gas conditioning, and more particularly, to natural gas conditioning and methods of operation thereof.

BACKGROUND

Natural gas is often a byproduct of oil production. Oil is found in hydrocarbon reservoirs such as coal beds, trapped by salt domes, or in other underground rock formation and structural traps. The natural gas produced along with the oil (known as field gas) is often flared off or sold but can also be captured and used as a fuel source.

In some applications, it is desired to use field gas directly as a fuel source. However, field gas cannot typically be used directly from the wellsite as a fuel source because the composition of the field gas can drastically vary. For example, field gas can have a high-water content (wet gas), a low water content (dry gas), a high hydrocarbon content (rich gas) and/or a low hydrocarbon content (lean gas). The produced field gas can have any number of compositions, such as: wet and rich, dry and lean, wet and lean, or dry and rich. This wide variety in gas quality and content can affect the heating value of the natural gas.

The varying heating value of the field gas can prevent the use of field gas as a reliable or high-quality fuel source for reciprocating engines. For example, while rich gas can be used in reciprocating engines, the engine typically runs at a lower performance envelope, with higher emissions, and is more prone to component failure.

The field gas composition can vary in other ways. For example, the pressure of the gas can vary from 3500 psi to 125 psi. In another example, the temperature of the gas can vary from −49° F. to 150° F. The gas can also contain hydrogen sulfide.

However, in certain conventional applications, conditioning field gas at the production site can be challenging. Conditioning the gas may require multiple processes, all of which may not be needed in certain applications. Certain conventional gas processing systems may require a large footprint onsite. Further, certain conventional gas processing systems may be difficult to transport and power. Therefore, certain conventional gas processing systems can be uneconomical, time-consuming, and/or challenging to use.

Therefore, what is needed is an apparatus, system or method that addresses one or more of the foregoing issues, among one or more other issues.

SUMMARY

In one embodiment, a modular gas processing system can include a low-pressure regulating module and a hose reel module. The low-pressure regulating module can include a low-pressure regulating module housing defining a low-pressure regulating module profile, a low-pressure gas inlet disposed within the low-pressure regulating module housing, a low-pressure gas outlet disposed within the low-pressure regulating module housing, and a low-pressure module pressure regulating valve disposed within the low-pressure regulating module housing and in fluid communication with the low-pressure gas inlet and the low-pressure gas outlet. The low-pressure module pressure regulating valve is configured to reduce a low-pressure inlet gas pressure to a low-pressure outlet gas pressure. The hose reel module includes a hose reel module housing defining a hose reel module profile substantially similar to the low-pressure regulating module profile, and a header disposed within the hose reel module housing. The header includes a header inlet and a plurality of header outlets. The header inlet is in fluid communication with the low-pressure gas outlet of the low-pressure regulating module. The hose reel module further includes a plurality of hose assemblies each disposed within the hose reel module housing. Each hose assembly includes a rotatable reel and a hose configured to be disposed at least partially around the reel and in fluid communication with the respective header outlet of the header.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1A:
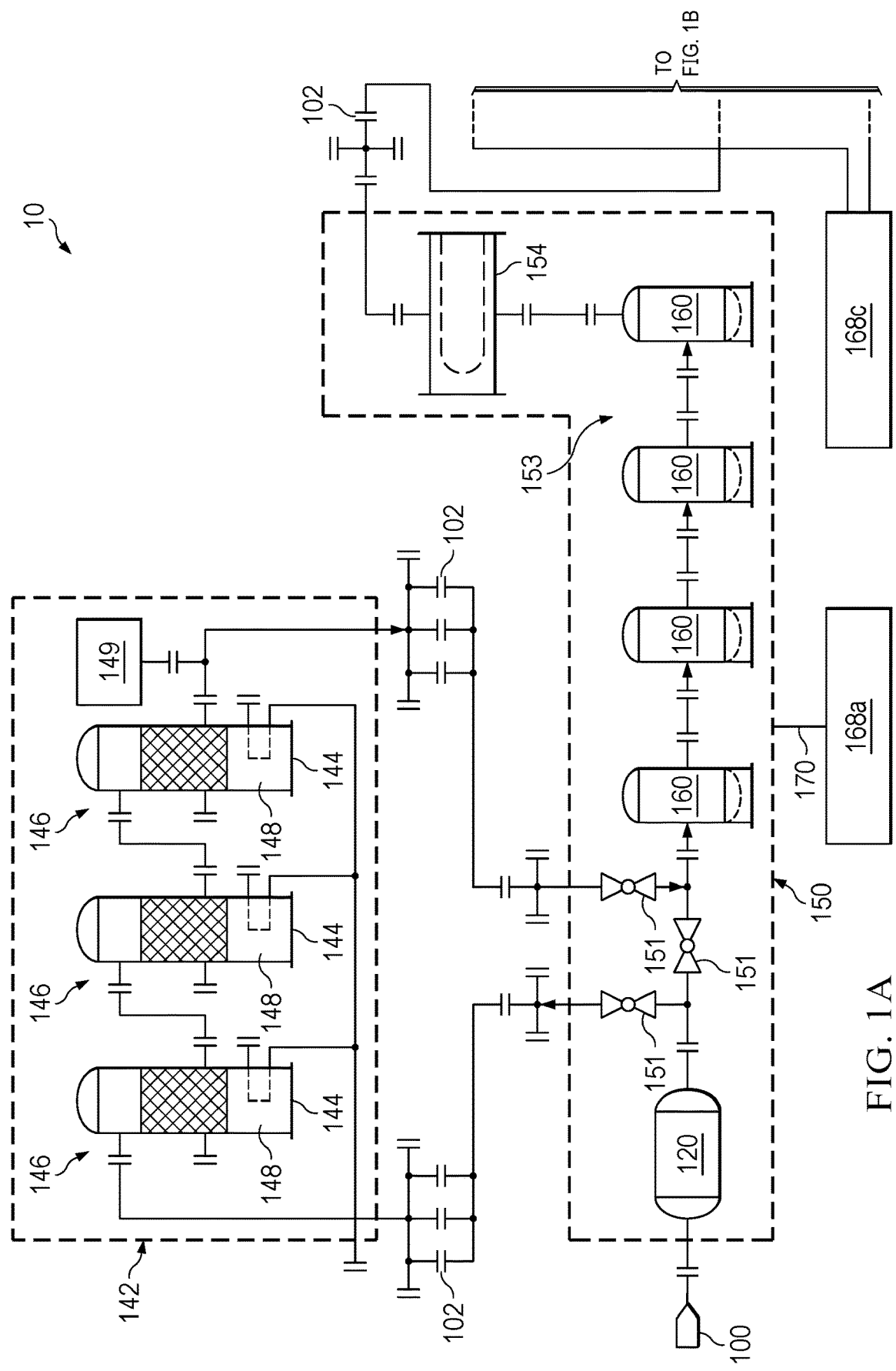
FIGS. 1A and 1B are schematic diagrams of a gas processing system in accordance with embodiments of the present disclosure.

The present disclosure relates generally to gas conditioning systems, and more particularly, to a modular gas processing system and methods of operations thereof. As described herein, embodiments of the modular gas processing system, individual modules/cubes, and methods of use thereof described herein address the issues described with respect to traditional gas conditioning configurations.

Certain conventional gas conditioning systems can be large or bulky, may require multiple conditioning processes, and may be powered by various fuel sources. During operation, certain conventional gas conditioning systems may not be able to adapt to varying flow rates and/or cooling demands. Further, certain conventional gas conditioning systems may not be able to provide a desired throughput, and/or may not be able to provide a desired fuel quality. As a result, conventional gas conditioning systems may be hard to transport, require additional fuel/support for operation, may not provide a desired throughput, may necessitate the need for additional gas treatment, or may reduce performance of downstream devices (e.g., generators).

As described herein, embodiments of the modular gas processing system can include modules/cubes that are mounted on a trailer to allow for portability and ease of transport. Further embodiments of the modular gas processing system can include design features incorporated in the individual modules to allow for flexible operation and layout. Certain embodiments of the modular gas processing system can be tailored to the composition of a field gas or the needs of a gas-powered downstream device.

The modular gas processing system uses modules to condition an onsite field gas and distributes a conditioned field gas for use in a gas-powered output/application. The example modular gas processing system embodiments shown in the drawings are not limiting. Each embodiment may or may not include the modules/cubes shown in the drawings and may include other modules/cubes not shown in the drawings as necessary to condition the field gas tuned to the composition of the field gas and the desired gas-powered downstream device.

Figure 1B:
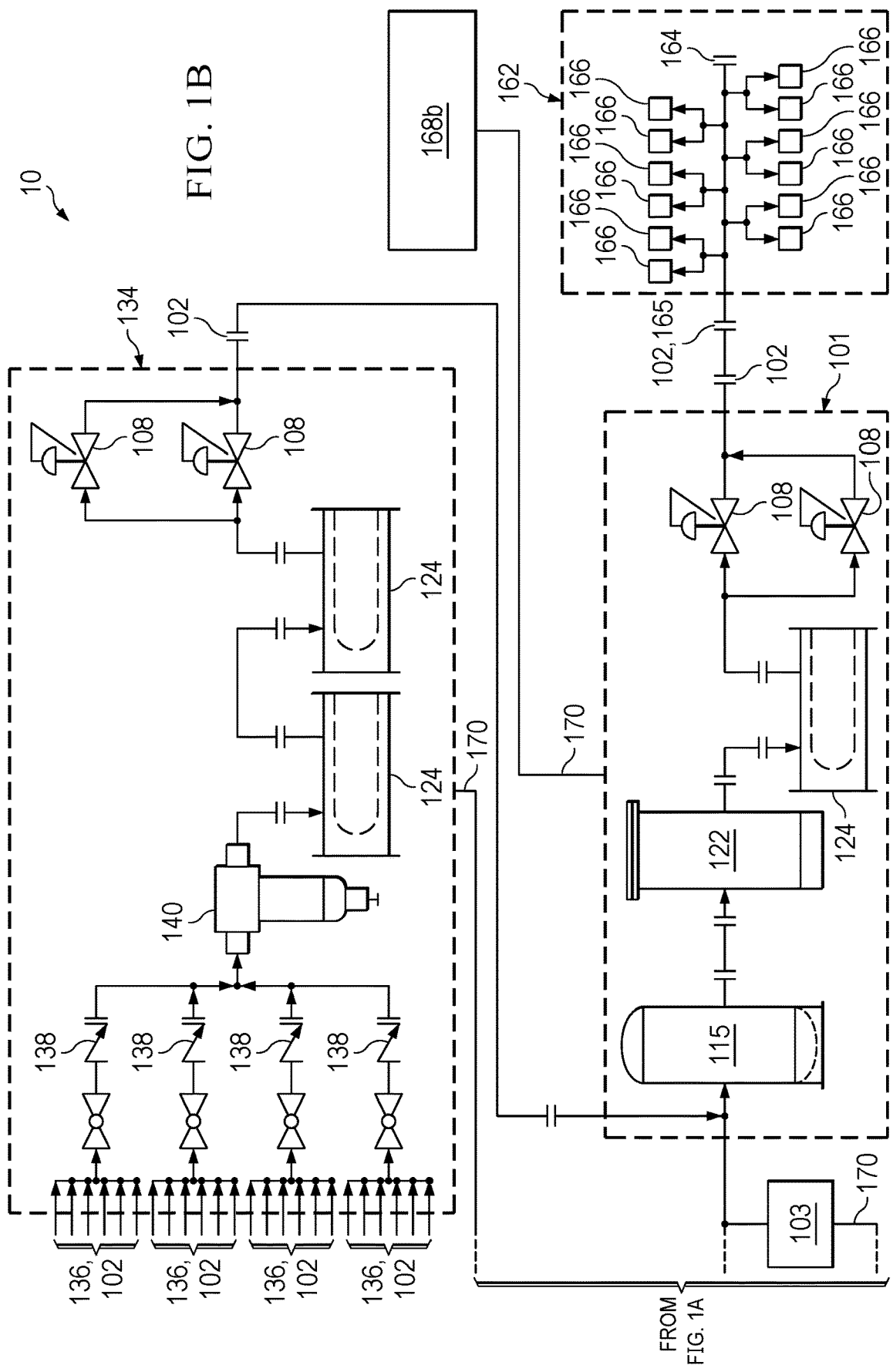

FIGS. 1A and 1B are schematic diagrams of a gas processing system 10 in accordance with embodiments of the present disclosure. In the depicted example, the gas processing system 10 utilizes a combination of interconnected modular gas processing modules to process or condition field gas from a gas inlet 100 and distribute the gas to one or more downstream devices via one or more hose reels 166. As described herein, the configuration or components of the gas processing system 10 can be selected based on the composition of the field gas and/or the desired downstream use or application.

In the depicted example, the gas processing system 10 can regulate the pressure of the field gas to a suitable value for one or more downstream devices. In some applications, the pressure of the field gas may be too high, too variable, or otherwise unsuitable for distribution or use by downstream gas devices. As illustrated, the gas processing system 10 includes a low-pressure regulating cube 101 to regulate a pressure of gas received from a gas inlet 100. Optionally, the gas processing system 10 can include a booster compressor 103 or module to increase the pressure of the field gas to a desired pressure. The output pressure of the regulated gas from the low-pressure regulating cube 101 can be tuned to the requirements of a downstream device and/or the requirements of the hose reel module 162 to facilitate distribution of the regulated gas. In some embodiments, the low-pressure regulating cube 101 can connect directly to an auxiliary output.

Further, the gas processing system 10 can distribute regulated or otherwise processed gas from the low-pressure regulating cube 101 to one or more downstream devices. As illustrated, the gas processing system can include a hose reel module 162 to distribute processed gas to one or more downstream devices. The hose reel module 162 can contain a plurality of hose reels with flexible hoses to direct output gas to downstream devices in various locations and/or different configurations. Downstream gas-powered devices may include but are not limited to generators, direct natural gas connections, and providing auxiliary power to other modules.

In some embodiments, the gas processing system 10 can include a gas dehydration or hydration regulating cube 150 to remove liquid content from the field gas. In some applications, the field gas may contain moisture levels that are too high or otherwise unsuitable for use by certain downstream gas devices. In some embodiments, the gas dehydration cube 150 removes bulk liquid from the field gas through an integrated slug catcher 120. After bulk liquid removal, the gas dehydration cube 150 may remove residual liquids through a triethylene glycol process loop 153.

In some embodiments, the gas processing system 10 can include a high-pressure regulating cube 134 to allow the use of auxiliary sources of gas. Further, in some applications, sources of field gas or other low-pressure gas sources may not provide sufficient fuel flow or energy for downstream devices. In the depicted example, the high-pressure regulating cube 134 allows for compressed natural gas to be used as a fuel source. In some embodiments, the high-pressure regulating cube 134 can receive natural gas from one or more trailers. During operation, the high-pressure regulating cube 134 depressurizes the compressed natural gas, rendering the compressed natural gas suitable for use in gas-powered applications. In the depicted example, the high-pressure regulating cube 134 provides the depressurized natural gas to the low-pressure regulating cube 101 to prepare the depressurized natural gas for distribution.

Optionally, the gas processing system 10 can include a hydrogen sulfide scrubbing or regulating cube 142 to remove hydrogen sulfide from the field gas. In some applications, the field gas may contain undesirable levels of hydrogen sulfide or may otherwise be considered "sour." In the depicted example, the hydrogen sulfide scrubbing cube 142 removes the hydrogen sulfide from the field gas by passing the field gas through one or more vessels 144 containing an adsorbent agent designed to remove hydrogen sulfide through an adsorption process. The "scrubbed" gas can be directed to the low-pressure regulating cube 101.

In the depicted example, one or more control cubes 168a, 168b, 168c can control the operation of each of the connected gas processing system modules. The connected gas processing system modules can supply operating information to the control cubes 168a, 168b, 168c for monitoring and control purposes. In some embodiments, one or more of the control cubes 168a, 168b, 168c contains an interface for a user to control the operation of the connected gas processing system modules. Optionally, one or more of the control cubes 168a, 168b, 168c distributes electrical power to each of the connected gas processing system modules.

In some embodiments, certain components of the gas processing system 10 can have individual, or dedicated control cubes 168a, 168b, 168c. For example, in some embodiments, operations of the gas dehydration cube 150 can be controlled by a control cube 168a. Further, in some embodiments, operations of the low-pressure regulating cube 101 can be controlled by a control cube 168b. Optionally, other components of the gas processing system 10, such as high-pressure regulating cube 134 and/or the booster compressor 103 can be controlled by an additional control cube 168c.

Figure 2A:
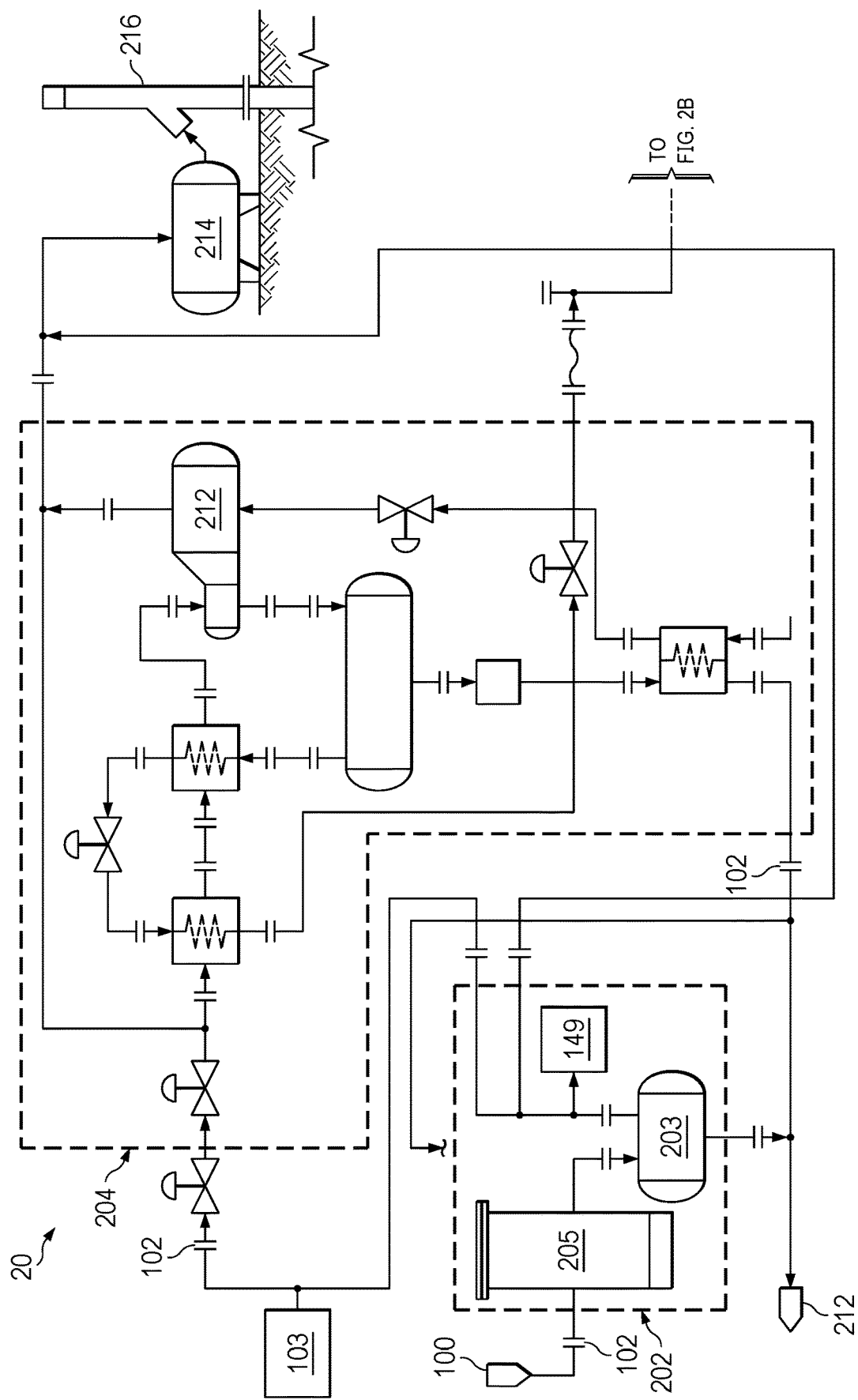
FIGS. 2A and 2B are schematic diagrams of a gas processing system in accordance with embodiments of the present disclosure.
Figure 2B:
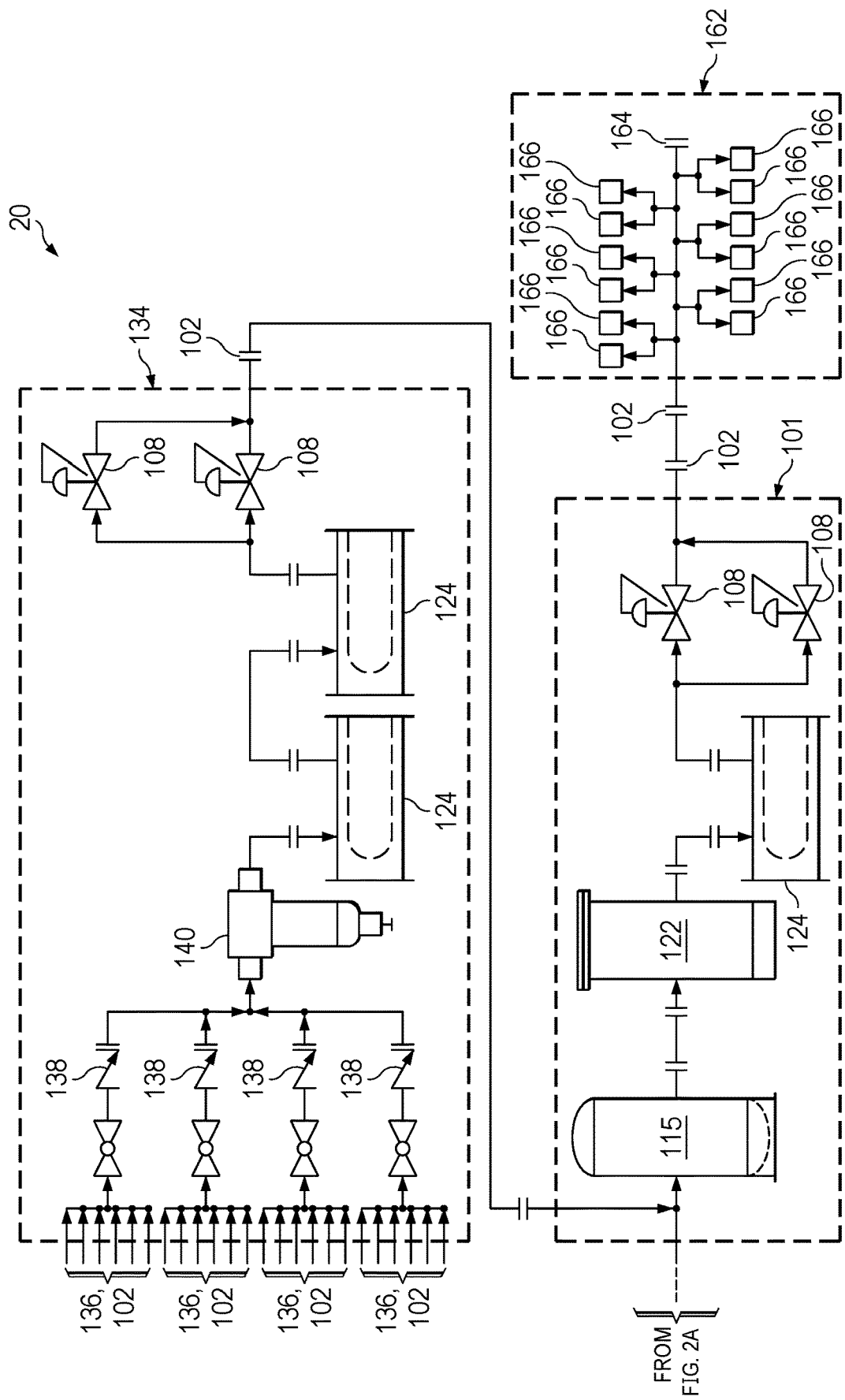

FIGS. 2A and 2B are schematic diagrams of a gas processing system 20 in accordance with embodiments of the present disclosure. Similar to gas processing system 10, the gas processing system 20 utilizes a selected combination of interconnected modular gas processing modules to process or condition field gas from a gas inlet 100 and distribute the gas to one or more downstream devices via one or more hose reels 166. Also similar to gas processing system 10, the configuration or components of the gas processing system 20 can be selected based on the composition of the field gas and/or the desired downstream use or application. In the depicted example, the gas processing system 20 can include modules and features that are similar to the modules and features of gas processing system 10, which are referred to with similar reference numerals. In addition to the components that have previously been described with respect to gas processing system 10, the gas processing system 20 can include a standalone slug catcher 202 to remove excess moisture and/or a mobile refrigeration unit 204 to remove heavy hydrocarbons.

In some embodiments, the gas processing system 20 can include a standalone slug catcher 202 to support further bulk liquid removal in conjunction with the gas dehydration cube 150. In some applications, the field gas may contain excess moisture that requires bulk liquid removal to be usable in downstream devices. Advantageously, the standalone slug catcher 202 can be used to improve the efficacy of the gas dehydration cube 150. The standalone slug catcher 202 is used to prevent fluids from entering any of the other gas processing system cubes of the gas processing system 20. In some embodiments, the slug catcher 202 can further include a coalescing filter 205 to remove impurities from the gas flow.

In some embodiments, the gas processing system 20 includes a mobile refrigeration unit 204 to condition a rich gas by removing heavy hydrocarbons from the field gas. In some applications, the field gas contain heavy hydrocarbons that may be unsuitable for use in certain downstream devices. The mobile refrigeration unit 204 separates the heavy hydrocarbons from the remaining field gas and directs the field gas to further processing. In certain applications, the mobile refrigeration unit 204 can include certain features described in pending U.S. application Ser. No. 17/679,776 filed Feb. 24, 2022, and titled "Mobile Refrigeration Unit." In some embodiments, the gas processing system 20 can include a booster compressor 103 or module to increase the pressure of the field gas entering the mobile refrigeration unit 204.

Advantageously, each module/cube in the modular gas processing system is a part of the whole modular gas processing system. Each cube is self-contained, and multiple different processes may be strung together to create a fully customized modular gas processing system that may be tuned to the composition of the field gas or to the requirements of a gas-powered output 164. As described herein, gas processing systems, such as gas processing system 10, 20, can be configured to include any combination of gas processing modules, such as a low-pressure regulating cube 101, a booster compressor 103, a gas dehydration cube 150, a hydrogen sulfide scrubbing cube 142, a high-pressure regulating cube 134, a hose reel module 162, a slug catcher 202, a mobile refrigeration unit 204, and control cubes 168a, 168b, 168c to process or condition field gas based on the composition of the field gas and/or the desired downstream use or application. Further, gas processing systems can include multiple modules of a single type (e.g., multiple gas dehydration cubes 150), based on the composition of the field gas and/or the desired downstream use or application.

Advantageously, configurations of gas processing systems can include one or more specific modules in response to the composition of the field gas and/or the desired downstream use or application. Further, configurations of gas processing systems can exclude one or more unneeded modules in response to the composition of the field gas and/or the desired downstream use or application, simplifying the configuration and transport of the gas processing system.

In some applications, a gas processing system can be configured to include a booster compressor 103 to boost gas pressure in response to low pressure field gas. In some applications, a field gas can be considered low pressure if the field gas pressure is 525 psi or below, and high pressure if the field gas pressure is above 525 psi.

Further, in some applications, a gas processing system can be configured to include a gas dehydration cube 150 to remove moisture from gas in response to wet field gas. In some applications, a field gas can be considered wet if the field gas includes a water content of more than 7 pounds of water per one million standard cubic feet of gas (MMSCF) and considered dry if the field gas includes a water content of 7 or fewer pounds of water per MMSCF. In some applications, the gas processing system can be configured to include a standalone slug catcher 202 for the bulk removal of moisture in response to excess moisture in the field gas.

In some applications, a gas processing system can be configured to include a mobile refrigeration unit 204 to process heavy hydrocarbons in response to rich field gas. In some applications, a field gas can be considered rich if the field gas contains predominantly heavy hydrocarbons, such as propane, and considered lean if the field gas contains predominantly light hydrocarbons, such as methane and ethane. In some applications, the gas processing system can be configured to include a standalone slug catcher 202 to further process heavy hydrocarbons in response to rich field gas.

In some applications, the gas processing system can be configured to include a hydrogen sulfide scrubbing cube 142 to remove hydrogen sulfide from the field gas in response to "sour" field gas. In some applications, field gas is considered "sour" if the field gas contains hydrogen sulfide or other impurities.

In some applications, the gas processing system can be configured to include a high-pressure regulating cube 134 to allow for supplemental compressed natural gas fuel flow in response to insufficient field gas flow or energy density. In some applications, field gas flow may be considered insufficient if the downstream energy demands outstrip the energy provided by the field gas. Further, in some applications, the high-pressure regulating cube 134 can be used to provide the sole or primary fuel flow for the gas processing system.

In some applications, the gas processing system can be configured to include a hose reel module 162 if downstream applications require processed gas to one or more downstream devices and/or if the downstream devices may not be reached by a rigid line. Optionally, the gas processing device can deliver processed gas to one or more downstream devices without the use of the hose reel module 162.

Therefore, gas processing systems can include specifically configured combinations of modules in response to the composition of the field gas and/or the desired downstream use or application. For example, in response to wet, high-pressure, lean, and "sour" gas where downstream devices require more energy than provided by the field gas, the gas processing system 10 illustrated in FIGS. 1A and 1B can be configured include, among other modules, a gas dehydration cube 150, a high-pressure regulating cube 134, and a hydrogen sulfide scrubbing cube 142 (as depicted in the fifth row of the table below). Similarly, in response to a wet, high-pressure, rich gas with no hydrogen sulfide present where downstream devices require more energy than provided by the field gas, the gas processing system 20 illustrated in FIGS. 2A and 2B can be configured to include a standalone slug catcher 202, a high-pressure regulating cube 134, and a mobile refrigeration unit 204 (as depicted in the 3rd row of the table below). As depicted in the table below, gas processing systems can be specifically configured with one or more modules based on the composition of the field gas and/or the desired downstream use or application.

| Field Gas Properties | | | | | Modules/Cubes Used | | | | | | | |
|---|---|---|---|---|---|---|---|---|---|---|---|---|
| Water Content | Pressure | Hydrocarbon Content | Hydrogen Sulfide Present? | Supplemental CNG Required? | Hose Reel Cube | Low-Pressure Regulating Cube | Gas Dehydration Cube | Standalone Slug Catcher | Mobile Refrigeration Unit | Booster Compressor | High-Pressure Regulating Cube | Hydrogen Sulfide Scrubbing Unit |
| Wet | High | Rich | Yes | Yes | ✓ | ✓ | ✓ | ✓ | ✓ | x | ✓ | ✓ |
| Wet | High | Rich | Yes | No | ✓ | ✓ | ✓ | ✓ | ✓ | x | x | ✓ |
| Wet | High | Rich | No | Yes | ✓ | ✓ | ✓ | ✓ | ✓ | x | ✓ | x |
| Wet | High | Rich | No | No | ✓ | ✓ | ✓ | ✓ | ✓ | x | x | x |
| Wet | High | Lean | Yes | Yes | ✓ | ✓ | ✓ | ✓ | x | x | ✓ | ✓ |
| Wet | High | Lean | Yes | No | ✓ | ✓ | ✓ | ✓ | x | x | x | ✓ |
| Wet | High | Lean | No | Yes | ✓ | ✓ | ✓ | ✓ | x | x | ✓ | x |
| Wet | High | Lean | No | No | ✓ | ✓ | ✓ | ✓ | x | x | x | x |
| Wet | Low | Rich | Yes | Yes | ✓ | ✓ | ✓ | ✓ | ✓ | ✓ | ✓ | ✓ |
| Wet | Low | Rich | Yes | No | ✓ | ✓ | ✓ | ✓ | ✓ | ✓ | x | ✓ |
| Wet | Low | Rich | No | Yes | ✓ | ✓ | ✓ | ✓ | ✓ | ✓ | ✓ | x |
| Wet | Low | Rich | No | No | ✓ | ✓ | ✓ | ✓ | ✓ | ✓ | x | x |
| Wet | Low | Lean | Yes | Yes | ✓ | ✓ | ✓ | ✓ | x | ✓ | ✓ | ✓ |
| Wet | Low | Lean | Yes | No | ✓ | ✓ | ✓ | ✓ | x | ✓ | x | ✓ |
| Wet | Low | Lean | No | Yes | ✓ | ✓ | ✓ | ✓ | x | ✓ | ✓ | x |
| Wet | Low | Lean | No | No | ✓ | ✓ | ✓ | ✓ | x | ✓ | x | x |
| Dry | High | Rich | Yes | Yes | ✓ | ✓ | x | ✓ | ✓ | x | ✓ | ✓ |
| Dry | High | Rich | Yes | No | ✓ | ✓ | x | ✓ | ✓ | x | x | ✓ |
| Dry | High | Rich | No | Yes | ✓ | ✓ | x | ✓ | ✓ | x | ✓ | x |
| Dry | High | Rich | No | No | ✓ | ✓ | x | ✓ | ✓ | x | x | x |
| Dry | High | Lean | Yes | Yes | ✓ | ✓ | x | x | x | x | ✓ | ✓ |
| Dry | High | Lean | Yes | No | ✓ | ✓ | x | x | x | x | x | ✓ |
| Dry | High | Lean | No | Yes | ✓ | ✓ | x | x | x | x | ✓ | x |
| Dry | High | Lean | No | No | ✓ | ✓ | x | x | x | x | x | x |
| Dry | Low | Rich | Yes | Yes | ✓ | ✓ | x | ✓ | ✓ | ✓ | ✓ | ✓ |
| Dry | Low | Rich | Yes | No | ✓ | ✓ | x | ✓ | ✓ | ✓ | x | ✓ |
| Dry | Low | Rich | No | Yes | ✓ | ✓ | x | ✓ | ✓ | ✓ | ✓ | x |
| Dry | Low | Rich | No | No | ✓ | ✓ | x | ✓ | ✓ | ✓ | x | x |
| Dry | Low | Lean | Yes | Yes | ✓ | ✓ | x | x | x | ✓ | ✓ | ✓ |
| Dry | Low | Lean | Yes | No | ✓ | ✓ | x | x | x | ✓ | x | ✓ |
| Dry | Low | Lean | No | Yes | ✓ | ✓ | x | x | x | ✓ | ✓ | x |
| Dry | Low | Lean | No | No | ✓ | ✓ | x | x | x | ✓ | x | x |
| N/A | N/A | N/A | No | Yes | ✓ | ✓ | x | x | x | x | ✓ | ✓ |
| Wet | High | Rich | Yes | Yes | x | ✓ | ✓ | ✓ | ✓ | x | ✓ | ✓ |
| Wet | High | Rich | Yes | No | x | ✓ | ✓ | ✓ | ✓ | x | x | ✓ |
| Wet | High | Rich | No | Yes | x | ✓ | ✓ | ✓ | ✓ | x | ✓ | x |
| Wet | High | Rich | No | No | x | ✓ | ✓ | ✓ | ✓ | x | x | x |
| Wet | High | Lean | Yes | Yes | x | ✓ | ✓ | ✓ | x | x | ✓ | ✓ |
| Wet | High | Lean | Yes | No | x | ✓ | ✓ | ✓ | x | x | x | ✓ |
| Wet | High | Lean | No | Yes | x | ✓ | ✓ | ✓ | x | x | ✓ | x |
| Wet | High | Lean | No | No | x | ✓ | ✓ | ✓ | x | x | x | x |
| Wet | Low | Rich | Yes | Yes | x | ✓ | ✓ | ✓ | ✓ | ✓ | ✓ | ✓ |
| Wet | Low | Rich | Yes | No | x | ✓ | ✓ | ✓ | ✓ | ✓ | x | ✓ |
| Wet | Low | Rich | No | Yes | x | ✓ | ✓ | ✓ | ✓ | ✓ | ✓ | x |
| Wet | Low | Rich | No | No | x | ✓ | ✓ | ✓ | ✓ | ✓ | x | x |
| Wet | Low | Lean | Yes | Yes | x | ✓ | ✓ | ✓ | x | ✓ | ✓ | ✓ |
| Wet | Low | Lean | Yes | No | x | ✓ | ✓ | ✓ | x | ✓ | x | ✓ |
| Wet | Low | Lean | No | Yes | x | ✓ | ✓ | ✓ | x | ✓ | ✓ | x |
| Wet | Low | Lean | No | No | x | ✓ | ✓ | ✓ | x | ✓ | x | x |
| Dry | High | Rich | Yes | Yes | x | ✓ | x | ✓ | ✓ | x | ✓ | ✓ |
| Dry | High | Rich | Yes | No | x | ✓ | x | ✓ | ✓ | x | x | ✓ |
| Dry | High | Rich | No | Yes | x | ✓ | x | ✓ | ✓ | x | ✓ | x |
| Dry | High | Rich | No | No | x | ✓ | x | ✓ | ✓ | x | x | x |
| Dry | High | Lean | Yes | Yes | x | ✓ | x | x | x | x | ✓ | ✓ |
| Dry | High | Lean | Yes | No | x | ✓ | x | x | x | x | x | ✓ |
| Dry | High | Lean | No | Yes | x | ✓ | x | x | x | x | ✓ | x |
| Dry | High | Lean | No | No | x | ✓ | x | x | x | x | x | x |
| Dry | Low | Rich | Yes | Yes | x | ✓ | x | ✓ | ✓ | ✓ | ✓ | ✓ |
| Dry | Low | Rich | Yes | No | x | ✓ | x | ✓ | ✓ | ✓ | x | ✓ |
| Dry | Low | Rich | No | Yes | x | ✓ | x | ✓ | ✓ | ✓ | ✓ | x |
| Dry | Low | Rich | No | No | x | ✓ | x | ✓ | ✓ | ✓ | x | x |
| Dry | Low | Lean | Yes | Yes | x | ✓ | x | x | x | ✓ | ✓ | ✓ |
| Dry | Low | Lean | Yes | No | x | ✓ | x | x | x | ✓ | x | ✓ |
| Dry | Low | Lean | No | Yes | x | ✓ | x | x | x | ✓ | ✓ | x |
| Dry | Low | Lean | No | No | x | ✓ | x | x | x | ✓ | x | x |
| N/A | N/A | N/A | No | Yes | x | ✓ | x | x | x | x | x | x |

Figure 3:
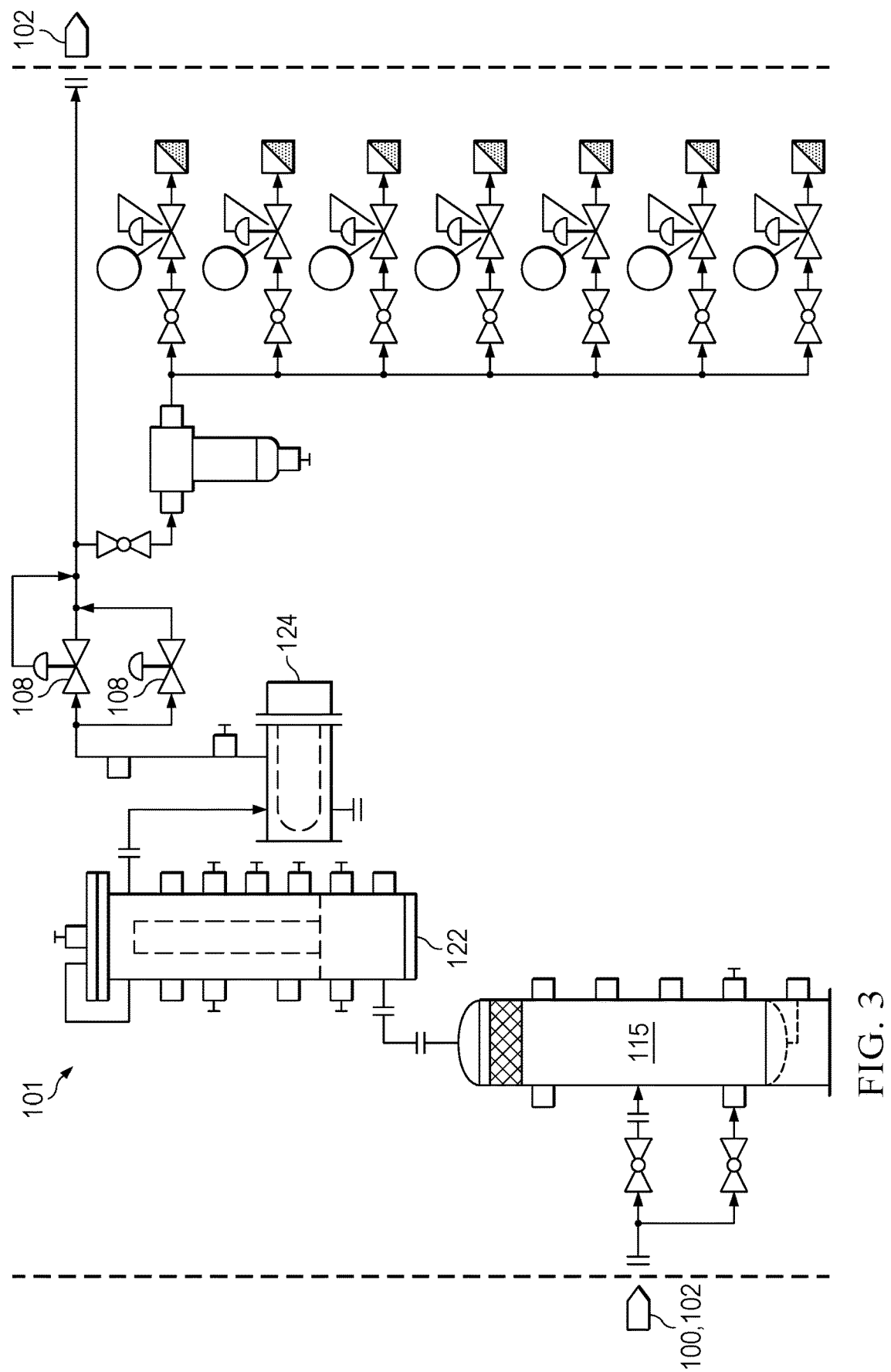
FIG. 3 is a schematic diagram of a low-pressure gas regulating cube in accordance with embodiments of the present disclosure.

FIG. 3 is a schematic diagram of a low-pressure regulating cube 101 in accordance with embodiments of the present disclosure. As depicted in FIGS. 1B and 3, the low-pressure regulating cube 101 conditions and regulates field gas pressure to allow for use in downstream devices.

In the depicted example, the low-pressure regulating cube 101 receives field gas directly or indirectly from a gas inlet 100. In some embodiments, the low-pressure regulating cube 101 can accept an inlet pressure range from about 200 psi to about 1500 psi. Similarly, the low-pressure regulating cube can decrease the pressure of the field gas flow from the inlet pressure to the range of about 50 psi to about 200 psi. Optionally, a booster compressor 103 may be added to supplement the pressure of the field gas flow to meet the downstream requirements of the field gas flow. In some embodiments, the low-pressure regulating cube 101 filters the field gas flow by passing the field gas flow through a fuel gas scrubber 115 and/or a coalescing filter 122. The fuel gas scrubber 115 and coalescing filter 122 remove impurities from the field gas flow, including but not limited to particulates in the field gas and any liquids present in the field gas flow. In some embodiments, the coalescing filter 122 can be suitable for use with inlet gas flows with varying pressures, for example, pressures ranging from about 50 psi to about 1300 psi.

The low-pressure regulating cube 101 then passes the gas through a fuel gas heater 124 to heat the field gas. To lower the pressure of the field gas flow to requirements of the hose reel module 162, the field gas flow passes through a pressure regulator 108 to reduce the pressure of the field gas. In some embodiments, the field gas may flow through multiple pressure regulators 108. In some embodiments, the pressure regulators 108 may be operated simultaneously or individually to regulate the pressure of the field gas flow. Each pressure regulator 108 is equipped with a double block and bleed valve arrangement, allowing for maintenance to be performed during modular gas processing system without shutting down the modular gas processing system. Optionally, the low-pressure regulating cube 101 can measure properties of the field gas flow (including inlet pressure and temperature, filter differential temperature, heater outlet temperature, heater element temperature, outlet pressure, outlet temperature, gas flowrate, temperature, and density) via a plurality of gauge readouts.

In the depicted example, the elements of the low-pressure regulating cube 101 can be disposed within a housing with a compact modular structure. In some embodiments, the low-pressure regulating cube 101 is configured to be stored, transported, and/or operated from a rectangular container (e.g., a container suitable for intermodal shipping). In some embodiments, the structure and profile of the low-pressure regulating cube 101 are configured to be transported by a trailer to facilitate transport to and from a wellsite. In some embodiments, the housing or structure of low-pressure regulating cube 101 can be configured to support another cube or module disposed on top of the low-pressure regulating cube 101. Optionally, the housing of the low-pressure regulating cube 101 can be moved or manipulated by a forklift or a crane. In some embodiments, the features of the housing of the low-pressure regulating cube 101 can be similar to the features of the housing of the hose reel module 162 depicted in at least FIG. 6.

As described herein, the housing of each module or cube described herein can include a profile and structural design similar to the profile and structural design of the housing of the low-pressure regulating cube 101. Advantageously, the commonality between the housing of the modules or cubes can allow for modularity and allow for unified handling, transport, storage, and configuration of the modules or cubes.

Further, in some embodiments, the low-pressure regulating cube 101 can have one or more interconnection points 102 that are configured to facilitate connections between cubes or modules of the gas processing system. For example, the low-pressure regulating cube 101 can be configured to place the inlets and outlets for operation on a single side or portion of the housing or structure to facilitate connections between multiple cubes or modules. Advantageously, each module or cube described herein can include interconnection points disposed on a common side or otherwise to facilitate connections therebetween either directly or via pipes or hoses.

With reference to FIG. 1A, the gas processing system can include a gas dehydration cube 150 to process or condition wet gas. In the depicted example, the gas dehydration cube 150 receives field gas from the gas inlet 100 to remove liquid content from the field gas. In some embodiments, the gas dehydration cube 150 first removes bulk liquid content from the field gas flow through an integrated slug catcher 120.

Optionally, the gas dehydration cube 150 includes a plurality of valves 151 to direct the field gas flow to either the hydrogen sulfide scrubbing cube 142 (if present) or to bypass the hydrogen sulfide scrubbing cube 142. As described herein, it is contemplated that the hydrogen sulfide scrubbing cube 142 may not be present in all configurations of gas processing systems.

Once the integrated slug catcher 120 in the gas dehydration cube 150 removes bulk liquid from the field gas, the gas dehydration cube 150 may accept the field gas flow into a triethylene glycol process loop 153 to remove any other residual liquids from the field gas flow. The triethylene glycol process loop 153 contains a plurality of contactors 160 where the field gas passes through. In the depicted example, the plurality of contactors 160 are connected in series, allowing the field gas to pass through each of the contactors 160. In the depicted example, the plurality of contactors 160 work in series together, increasing the overall length the field gas passes through the contactors 160, increasing dwell time of the field gas and the effectiveness of the contactors 160. Advantageously, by utilizing a plurality of contactors 160, the gas dehydration cube 150 can have the capacity of a larger or longer contactor without the increased height or envelope constraints of a single larger contactor.

In some embodiments, the triethylene glycol process loop 153 can include a glycol boiler. The glycol boiler can include an electrical heating unit. Once the field gas flow passes through the triethylene glycol process loop 153, the gas dehydration cube 150 removes any residual triethylene glycol by use of a gas-glycol exchanger 154. As previously discussed, the gas dehydration cube 150 passes the newly dehydrated gas to the low-pressure regulating cube 101.

As described herein, elements of the gas dehydration cube 150 can be disposed within a housing with a structural design similar to the structural design of the housing of the low-pressure regulating cube 101. Further, in some embodiments, the gas dehydration cube 150 can have interconnection points 102 that are configured to facilitate connections between cubes or modules of the gas processing system in a similar manner as the low-pressure regulating cube 101.

Figure 4:
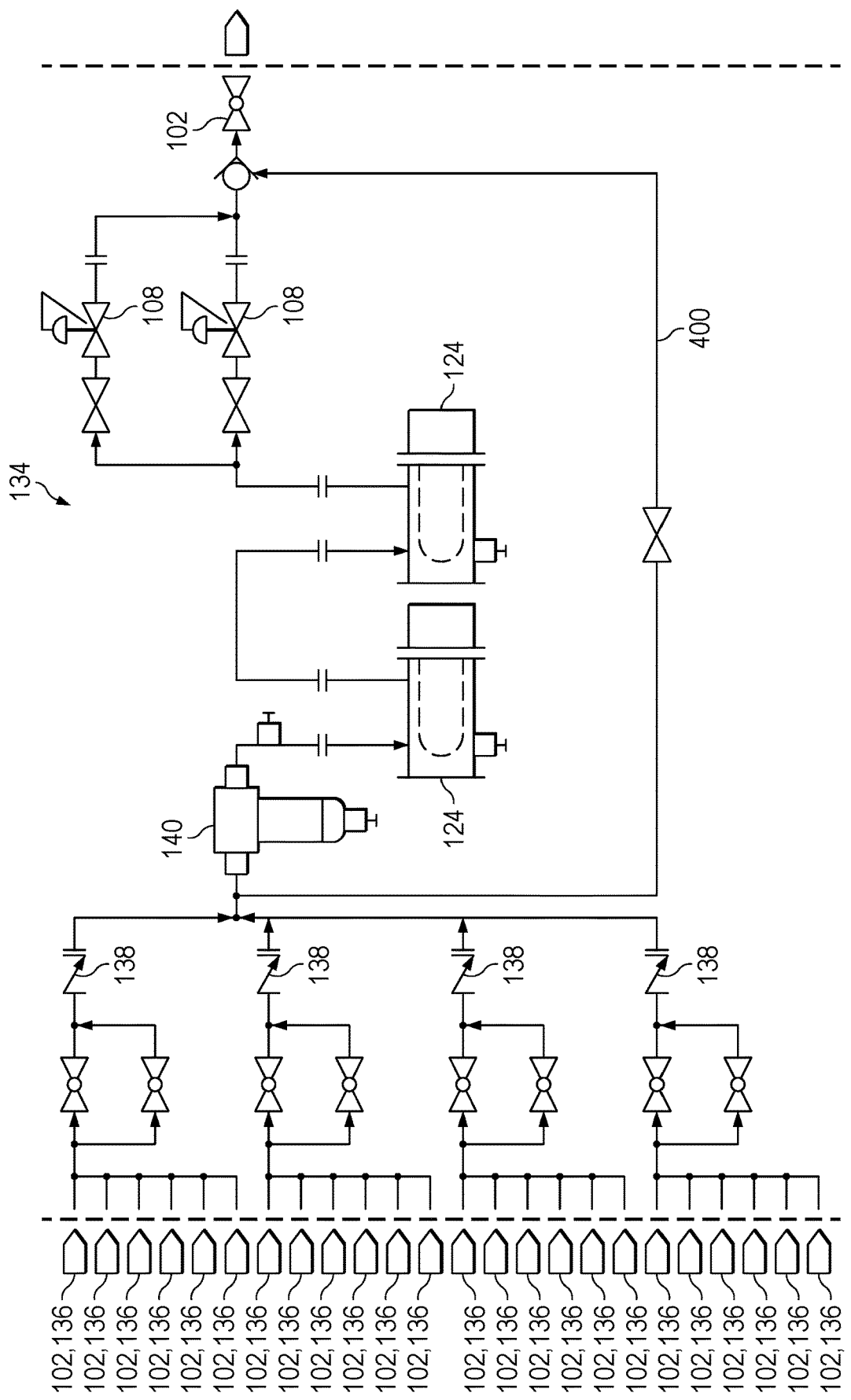
FIG. 4 is a schematic diagram of a high-pressure gas regulating cube in accordance with embodiments of the present disclosure.

FIG. 4 is a schematic diagram of a high-pressure regulating cube 134 in accordance with embodiments of the present disclosure. In the embodiment depicted in FIGS. 1A and 1B the gas processing system 10 uses both the field gas and a compressed natural gas source as gas sources. The compressed natural gas source is optional, is used to supplement the field gas flow, and is regulated in the high-pressure regulating cube 134, as depicted in FIGS. 1B and 4. The high-pressure regulating cube 134 may include a plurality of high-pressure gas inlets 136, allowing for one or more compressed natural gas sources to supplement the field gas. In some embodiments, the high-pressure regulating cube 134 may use only one gas inlet 136. In some embodiments, the high-pressure gas inlet 136 on the high-pressure regulating cube 134 has a gas inlet manifold 138 to prevent the compressed natural gas from flowing into other compressed natural gas trailers. Optionally, a high-pressure coalescing filter 140 removes impurities from the compressed natural gas flow including but not limited to particulates in the field gas and any liquids present in the compressed natural gas flow. In the embodiment depicted in FIGS. 1B and 4, the high-pressure regulating cube 134 can accept a compressed natural gas source up to about 5,000 psi.

Once the high-pressure regulating cube 134 filters impurities from the compressed natural gas stream, the high-pressure regulating cube 134 heats the compressed natural gas stream to prepare the compressed natural gas to be isenthalpically expanded to ready the compressed natural gas stream for processing by the low-pressure regulating cube 101. In this embodiment, the compressed natural gas stream is heated in a plurality of fuel gas heaters 124. After preheating the compressed natural gas in the fuel gas heaters 124, the high-pressure regulating cube 134 isenthalpically expands the gas stream, where the cooling from the isenthalpic expansion is offset by the preheating. Advantageously, as the compressed natural gas source trailer starts to depressurize during use as the compressed natural gas source depletes, the isenthalpic expansion and preheating processes are automatically bypassed through an optionally included bypass 400, as shown in FIG. 4. The high-pressure regulating cube 134 passes the resulting processed gas stream to the low-pressure regulating cube 101.

As described herein, elements of the high-pressure regulating cube 134 can be disposed within a housing with a profile and structural design similar to the profile and structural design of the housing of the low-pressure regulating cube 101. Further, in some embodiments, the high-pressure regulating cube 134 can have interconnection points 102 that are configured to facilitate connections between cubes or modules of the gas processing system in a similar manner as the low-pressure regulating cube 101.

If hydrogen sulfide is present in the field gas, the plurality of valves 151 in the gas dehydration cube 150 can be operated to divert the field gas flow from the integrated slug catcher 120 to the hydrogen sulfide scrubbing cube 142. In the embodiment depicted in FIG. 1A, the hydrogen sulfide scrubbing cube 142 accepts the field gas flow and removes hydrogen sulfide from the field gas by passing the field gas through a plurality of vessels 144 containing an adsorbent designed to remove hydrogen sulfide. While the embodiment depicted in FIG. 1A removes hydrogen sulfide by an adsorbent, it is contemplated that other methods of removing hydrogen sulfide may be used in place of an adsorbent. In the depicted embodiment, each vessel 144 is designed to open at the top of the vessel 146 to place the adsorbent inside the vessel 144 and is designed to open at the bottom of the vessel 148 to facilitate removing the used or spent adsorbent. Once the hydrogen sulfide scrubbing cube 142 removes the hydrogen sulfide from the field gas, the hydrogen sulfide scrubbing cube 142 uses an optional hydrogen sulfide analyzer 149 to measure any remaining hydrogen sulfide content. The hydrogen sulfide analyzer 149 can detect hydrogen sulfide present in the field gas from a level of zero parts per million of hydrogen sulfide to about 100 parts per million of hydrogen sulfide. In this embodiment, the hydrogen sulfide scrubbing cube 142 passes the field gas back to the gas dehydration cube 150 through operation of the plurality of valves 151 in the gas dehydration cube 150, but may be configured to direct the field gas to another module/cube.

As described herein, elements of the hydrogen sulfide scrubbing cube 142 can be disposed within a housing with a profile and structural design similar to the profile and structural design of the housing of the low-pressure regulating cube 101. Further, in some embodiments, the hydrogen sulfide scrubbing cube 142 can have interconnection points 102 that are configured to facilitate connections between cubes or modules of the gas processing system in a similar manner as the low-pressure regulating cube 101.

The embodiment shown in FIG. 2A accepts the field gas at the gas inlet 100 and directs the gas to a standalone slug catcher 202. In the illustrated embodiment, the standalone slug catcher 202 operates in a similar manner as the integrated slug catcher 120 of FIG. 1A. The standalone slug catcher 202 collects the bulk liquids from the field gas. In this embodiment, because the field gas is a gas rich in hydrocarbon content, the standalone slug catcher 202 includes an optional natural gas liquids return line 212, connected to the bulk liquid removal vessel 203 of the standalone slug catcher 202. In this embodiment, the standalone slug catcher 202 includes the hydrogen sulfide analyzer 149, just as in the hydrogen sulfide scrubbing cube 142 of FIG. 1A. While the standalone slug catcher 202 removes liquid through a bulk liquid removal vessel 203, it is contemplated that other bulk liquid removal devices and forms of storing the removed liquids may be substituted.

As described herein, elements of the standalone slug catcher 202 can be disposed within a housing with a profile and structural design similar to the profile and structural design of the housing of the low-pressure regulating cube 101. Further, in some embodiments, the standalone slug catcher 202 can have interconnection points 102 that are configured to facilitate connections between cubes or modules of the gas processing system in a similar manner as the low-pressure regulating cube 101.

After the standalone slug catcher 202 removes the bulk liquid content, the embodiment shown in FIG. 2A treats the field gas rich in hydrocarbon content by processing the field gas through the mobile refrigeration unit 204. The mobile refrigeration unit 204 processes the field gas by separating out the heavy hydrocarbons from the field gas and directing the heavy hydrocarbons to a storage tank 214 and/or flare stack 216 via a natural gas return line 212. In certain applications, the mobile refrigeration unit can include certain features described in pending U.S. application Ser. No. 17/679,776 filed Feb. 24, 2022, and titled "Mobile Refrigeration Unit." Further, in some embodiments, the mobile refrigeration unit 204 can have interconnection points 102 that are configured to facilitate connections between cubes or modules of the gas processing system in a similar manner as the low-pressure regulating cube 101.

Figure 5:
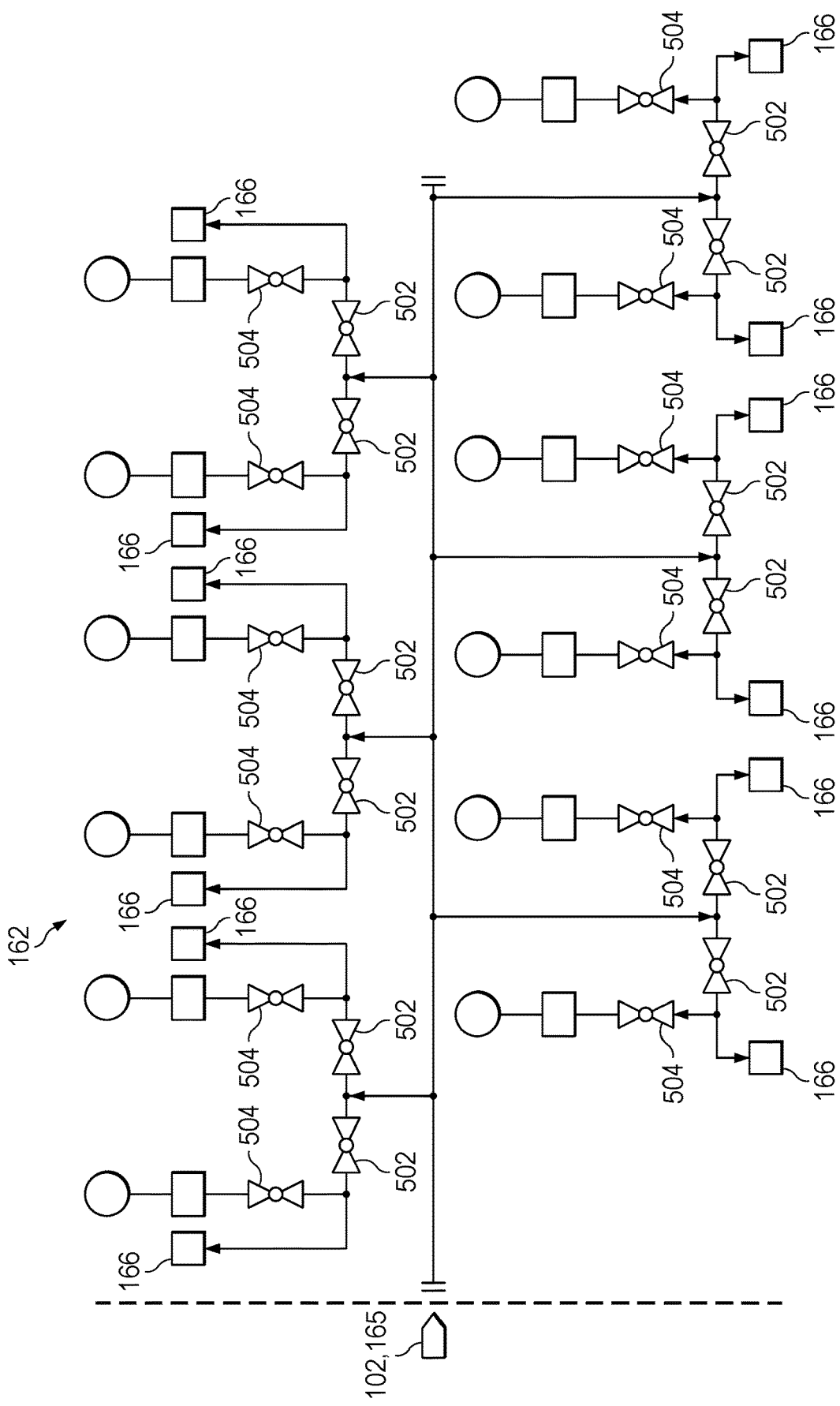
FIG. 5 is a schematic diagram of a hose reel module in accordance with embodiments of the present disclosure.
Figure 6:
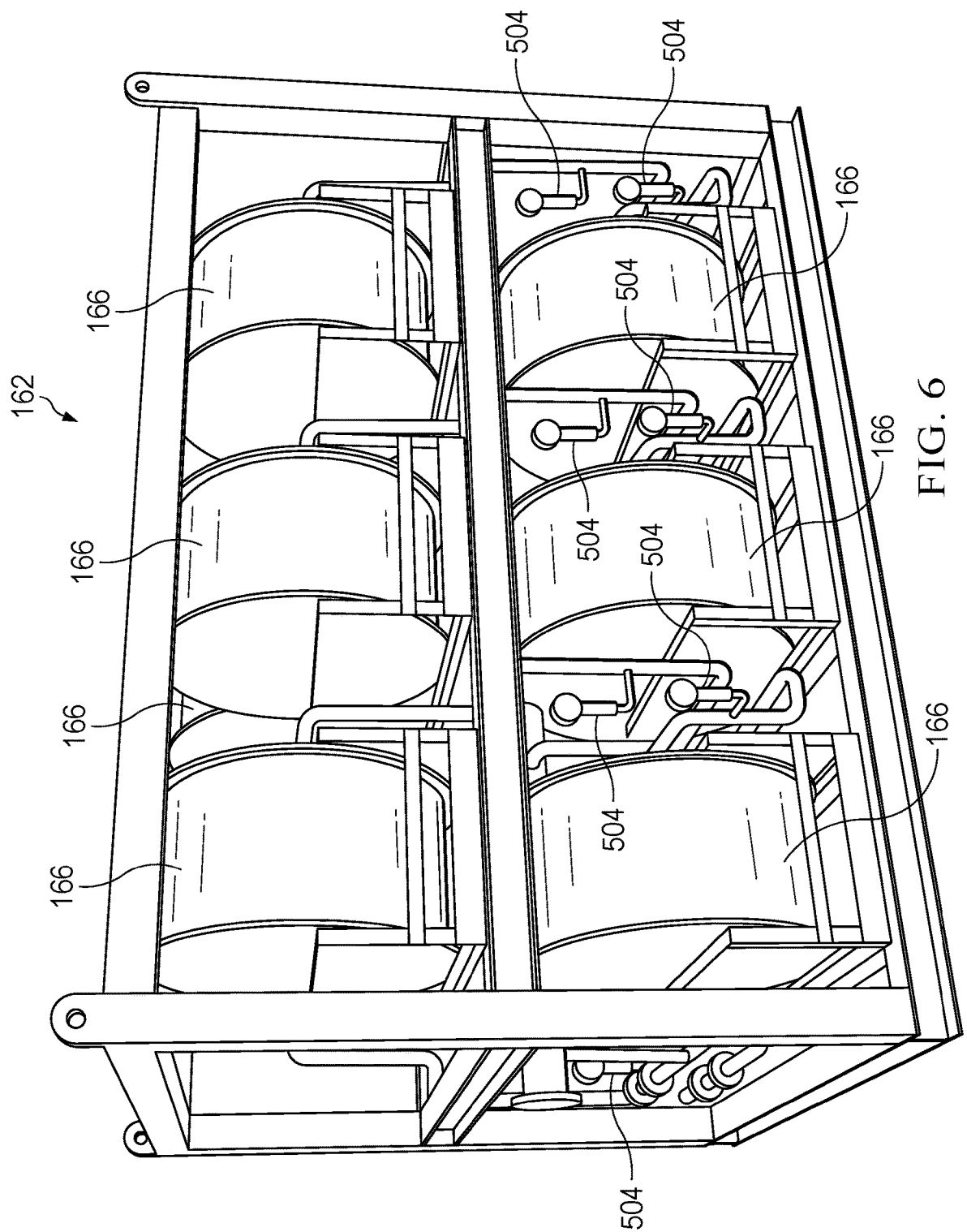
FIG. 6 is a front perspective view of a hose reel module of FIG. 5.

FIG. 5 is a schematic diagram of a hose reel module 162 in accordance with embodiments of the present disclosure. FIG. 6 is a front perspective view of a hose reel module 162 of FIG. 5. In the depicted example, the hose reel module 162 distributes gas from the gas processing system to one or more downstream devices via one or more flexible hoses.

As illustrated, hose reel module 162 accepts the processed gas from the low-pressure regulating cube 101 and distributes the processed gas to one or more of hose reels 166. In some applications, the hose reel module 162 can accept gas at a pressure from about 200 psi to 50 psi and can distribute gas at about 50 psi to 200 psi, depending on the downstream requirements. In some embodiments, the hose reel module 162 may be able to accept gas from another module/cube. In some embodiments, the gas received in the hose reel module 162 is distributed to the hose reels 166 via a header 165. The header 165 receives the processed gas and distributes the gas to one or more outlets that are in fluid communication with each respective hose reel 166.

Optionally, the hose reel module 162 can control flow to each of the hose reels 166 via a control valve 502 corresponding to (and in fluid communication with) each respective hose reel 166. Advantageously, the independent control valves 502 allow each hose reel 166 (and corresponding downstream device) to be operated independently of other hose reels 166 and downstream devices. In some embodiments, the hose reel module 162 includes a venting point 504 to allow for depressurization of a selected hose reel 166 to facilitate removal or servicing of the hose reel 166 or a downstream device.

During operation, a flexible hose can be extended or unwound from a respective hose to facilitate a connection from the gas processing system to a downstream device. Advantageously, the hose reels 166 each have a flexible hose that moves freely for greater range of connecting to the desired gas-powered output 164. Optionally, the hose on the hose reel 166 may be coated or encapsulated with a burst protection covering, leak protection, and hose burst protection. The hose can be wound and unwound around a rotatable reel structure. In some embodiments, the hose reels 166 are rotated by an electronically powered motor.

As described herein, the elements of the hose reel module 162 can be disposed within a housing with a profile and structural design similar to the profile and structural design of the housing of the low-pressure regulating cube 101. Further, in some embodiments, the hose reel module 162 can have interconnection points 102 that are configured to facilitate connections between cubes or modules of the gas processing system in a similar manner as the low-pressure regulating cube 101.

With reference to FIG. 1A, the operation of the modular gas processing system is coordinated through one or more control cubes 168*a*, 168*b*, 168*c*. For example, in some embodiments, operations of the gas dehydration cube 150 can be controlled by a control cube 168*a*. Further, in some embodiments, operations of the low-pressure regulating cube 101 can be controlled by a control cube 168*b*. Optionally, other components of the gas processing system 10, such as high-pressure regulating cube 134 and/or the booster compressor 103 can be controlled by an additional control cube 168*c*. Each of the control cubes 168*a*, 168*b*, 168*c* can include integrated PLC controls. In the depicted embodiment, the high-pressure regulating cube 134, low-pressure regulating cube 101, hydrogen sulfide scrubbing cube 142, standalone slug catcher 202 (as shown in FIG. 2A), and a gas analyzer can provide information to the PLC of the respective control cubes 168*a*, 168*b*, 168*c*. Other modules may provide information to the control cubes 168*a*, 168*b*, 168*c*. In this embodiment, the information includes but is not limited to pressure of the field gas, temperature of the field gas, valve positions in the connected modular gas processing system modules, gas flowrate in the connected modular gas processing system modules, gas property analysis, and downstream device status. Optionally, the control cubes 168*a*, 168*b*, 168*c* can provide ethernet connectivity to another component such as a switchgear trailer. In this embodiment, the control cubes 168*a*, 168*b*, 168*c* provide power to each of the modules/cubes in the modular gas processing system through a 480-volt inlet including, but not limited to, the high-pressure regulating cube 134, low-pressure regulating cube 101, and hose reel module 162. It is contemplated that other power standards may be used in providing power from the control cube to modules/cubes, and power may be distributed to modules/cubes not listed here. Advantageously, the control cubes 168*a*, 168*b*, 168*c* provide electrical power through common electrical connections 170, interchangeable between the modules/cubes in the modular gas processing system.

As described herein, the elements of the control cubes 168*a*, 168*b*, 168*c* can be disposed within a housing with a profile and structural design similar to the profile and structural design of the housing of the low-pressure regulating cube 101. Further, in some embodiments, the control cubes 168*a*, 168*b*, 168*c* can have common electrical connections 170 that are configured to facilitate connections between cubes or modules of the gas processing system in a similar manner as the low-pressure regulating cube 101.

It is understood that variations may be made in the foregoing without departing from the scope of the present disclosure. In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

The invention claimed is:

1. A modular gas processing system, comprising:
   a low-pressure regulating module comprising:
      a low-pressure regulating module housing defining a low-pressure regulating module profile;
      a low-pressure gas inlet disposed within the low-pressure regulating module housing;
      a low-pressure gas outlet disposed within the low-pressure regulating module housing;
      a low-pressure module pressure regulating valve disposed within the low-pressure regulating module housing and in fluid communication with the low-pressure gas inlet and the low-pressure gas outlet, wherein the low-pressure module pressure regulating valve is configured to reduce a low-pressure inlet gas pressure to a low-pressure outlet gas pressure; and
   a hose reel module comprising:
      a hose reel module housing defining a hose reel module profile substantially similar to the low-pressure regulating module profile;
      a header disposed within the hose reel module housing and comprising a header inlet and a plurality of header outlets, wherein the header inlet is in fluid communication with the low-pressure gas outlet of the low-pressure regulating module; and
      a plurality of hose assemblies each disposed within the hose reel module housing, each hose assembly comprising:
         a rotatable reel; and
         a hose configured to be disposed at least partially around the reel and in fluid communication with a respective header outlet of the header.

2. The modular gas processing system of claim 1, further comprising:
   a high-pressure regulating module comprising:
      a high-pressure regulating module housing defining a high-pressure regulating module profile substantially similar to the low-pressure regulating module profile;
      a high-pressure gas inlet disposed within the high-pressure regulating module housing;
      a high-pressure gas outlet disposed within the high-pressure regulating module housing; and
      a high-pressure module pressure regulating valve disposed within the high-pressure regulating module housing and in fluid communication with the high-pressure gas inlet and the high-pressure gas outlet, wherein the high-pressure module pressure regulating valve is configured to reduce a high-pressure inlet gas pressure to a high-pressure outlet gas pressure and the low-pressure gas inlet of the low-pressure regulating module is in fluid communication with the high-pressure gas outlet of the high-pressure regulating module.

3. The modular gas processing system of claim 1, further comprising:
   a hydrogen sulfide regulating module, comprising:
      a hydrogen sulfide regulating structure defining a hydrogen sulfide regulating module profile substantially similar to the low-pressure regulating module profile;
      a hydrogen sulfide rich gas inlet disposed within the hydrogen sulfide regulating module housing;
      a sweetened gas outlet disposed within the hydrogen sulfide regulating module housing; and
      a vessel disposed within the hydrogen sulfide regulating module housing and in fluid communication with the hydrogen sulfide rich gas inlet and the sweetened gas outlet, wherein the vessel contains a hydrogen sulfide adsorbent agent and the sweetened gas outlet is in fluid communication with the low-pressure gas inlet of the low-pressure regulating module.

4. The modular gas processing system of claim 1, further comprising:
   a gas hydration regulating module, comprising:
      a gas hydration regulating module housing;
      a wet gas inlet disposed within the gas hydration regulating module housing;
      a dehydrated gas outlet disposed within the gas hydration regulating module housing and in fluid communication with the low-pressure gas inlet of the low-pressure regulating module; and
      a contactor in fluid communication with the wet gas inlet and the dehydrated gas outlet, wherein the contactor is configured to remove moisture from a wet gas flow received from the wet gas inlet.

5. The modular gas processing system of claim 1, further comprising:
   a bulk liquid removal device, comprising:
      a liquid rich gas inlet;
      a liquid outlet;
      a dry gas outlet in fluid communication with the low-pressure gas inlet of the low-pressure regulating module; and
      a gas-liquid separation vessel in fluid communication with the liquid rich gas inlet, the liquid outlet, and the dry gas outlet, wherein the gas-liquid separation vessel is configured to direct liquid from the liquid rich gas inlet to the liquid outlet and to direct gas from the liquid rich gas inlet to the dry gas outlet.

6. The modular gas processing system of claim 1, further comprising:
   an operation control module, comprising:
      a programmable logic controller configured to control operation of the low-pressure regulating module, the programmable logic controller configured to perform a method comprising:
         evaluating a gas parameter; and
         controlling operation of the low-pressure module pressure regulating valve; and
      a power delivery module configured to deliver power to the low-pressure regulating module and the hose reel module.

7. The modular gas processing system of claim 1, further comprising a mobile refrigeration module in fluid communication with the low-pressure gas inlet of the low-pressure regulating module and configured to remove heat from a flow.

* * * * *